(12) United States Patent
Chang et al.

(10) Patent No.: US 7,889,686 B1
(45) Date of Patent: Feb. 15, 2011

(54) SEAMLESS SWITCHING OF MEDIA STREAMS BETWEEN DIFFERENT NETWORKS

(75) Inventors: Lu Chang, Cupertino, CA (US); Paul Aerick Lambert, Mountain View, CA (US)

(73) Assignee: Picomobile Networks, Inc., Santa Clara, CA (US)

( * ) Notice: Subject to any disclaimer, the term of this patent is extended or adjusted under 35 U.S.C. 154(b) by 639 days.

(21) Appl. No.: 11/764,796

(22) Filed: Jun. 18, 2007

Related U.S. Application Data

(60) Provisional application No. 60/860,627, filed on Nov. 21, 2006.

(51) Int. Cl.
| | |
|---|---|
| H04B 7/00 | (2006.01) |
| H04L 12/26 | (2006.01) |
| H04J 1/16 | (2006.01) |
| G01R 31/08 | (2006.01) |
| G08C 15/00 | (2006.01) |
| H04W 40/00 | (2009.01) |
| H04W 36/00 | (2009.01) |

(52) U.S. Cl. .............. 370/310; 370/231; 370/235; 455/445; 455/552.1; 455/553.1; 455/436

(58) Field of Classification Search ......... 455/436–453, 455/552.1, 553.1; 370/310, 331, 352, 260–261, 370/231, 235; 348/14.01–14.12; 725/62, 725/81, 99

See application file for complete search history.

(56) References Cited

U.S. PATENT DOCUMENTS

| | | | |
|---|---|---|---|
| 5,738,583 A | 4/1998 | Comas et al. | |
| 6,272,120 B1 | 8/2001 | Alexander | |
| 6,600,726 B1 | 7/2003 | Nevo et al. | |
| 6,690,935 B1 | 2/2004 | Calot et al. | |
| 6,704,866 B1 | 3/2004 | Benayoun et al. | |
| 6,707,801 B2 | 3/2004 | Hsu | |
| 6,760,587 B2 * | 7/2004 | Holtzman et al. | ........... 455/436 |
| 6,785,892 B1 | 8/2004 | Miller | |
| 6,788,675 B1 | 9/2004 | Yang | |
| 6,793,580 B2 | 9/2004 | Sinclair et al. | |
| 6,795,701 B1 | 9/2004 | Baker et al. | |
| 6,799,056 B2 | 9/2004 | Curley et al. | |
| 6,859,460 B1 | 2/2005 | Chen | |
| 6,879,574 B2 | 4/2005 | Naghian et al. | |
| 6,879,812 B2 | 4/2005 | Agrawal et al. | |
| 6,909,705 B1 | 6/2005 | Lee et al. | |
| 6,932,698 B2 | 8/2005 | Sprogis | |
| 7,013,391 B2 | 3/2006 | Herle et al. | |
| 7,072,323 B2 | 7/2006 | Roberts et al. | |
| 7,073,129 B1 | 7/2006 | Robarts et al. | |
| 7,097,562 B2 | 8/2006 | Gagner | |
| 7,181,544 B2 | 2/2007 | Vangal et al. | |

(Continued)

OTHER PUBLICATIONS

Meredith, John; "Voice Call Continuity in 3GPP"; CompactPCI and AdvancedTCA systems; Apr. 2006; 2 pages.

(Continued)

Primary Examiner—George Eng
Assistant Examiner—Wesley L Kim

(57) ABSTRACT

The present invention is a system of reception or transmission of media data, such as for audio or video streams, so that data communications alternate transmission or reception routes between available communications networks, choosing among parallel or single communications paths a most efficient and/or most reliable path for transmission of media packets.

16 Claims, 2 Drawing Sheets

U.S. PATENT DOCUMENTS

| | | | |
|---|---|---|---|
| 7,224,964 | B2 | 5/2007 | Souissi et al. |
| 7,236,772 | B1 | 6/2007 | Botzas |
| 7,251,235 | B2 | 7/2007 | Wentink |
| 7,308,263 | B2 | 12/2007 | Gallagher et al. |
| 7,324,444 | B1 | 1/2008 | Liang et al. |
| 7,400,722 | B2 | 7/2008 | Qi et al. |
| 7,440,430 | B1* | 10/2008 | Jagadeesan et al. ......... 370/331 |
| 7,452,278 | B2 | 11/2008 | Chen et al. |
| 2002/0151366 | A1 | 10/2002 | Walker et al. |
| 2002/0191560 | A1 | 12/2002 | Chen et al. |
| 2002/0199124 | A1 | 12/2002 | Adkisson |
| 2003/0069018 | A1 | 4/2003 | Matta et al. |
| 2003/0182454 | A1 | 9/2003 | Huth et al. |
| 2003/0231625 | A1 | 12/2003 | Calvignac |
| 2004/0066751 | A1 | 4/2004 | Tseng et al. |
| 2004/0105415 | A1 | 6/2004 | Fujiwara et al. |
| 2004/0127277 | A1 | 7/2004 | Walker et al. |
| 2004/0174829 | A1 | 9/2004 | Ayyagari |
| 2004/0185851 | A1 | 9/2004 | Nagai |
| 2004/0196808 | A1 | 10/2004 | Chaskar et al. |
| 2005/0025163 | A1* | 2/2005 | Christie ...................... 370/401 |
| 2005/0032577 | A1 | 2/2005 | Blackburn et al. |
| 2005/0041660 | A1 | 2/2005 | Pennec et al. |
| 2005/0073980 | A1 | 4/2005 | Thomson et al. |
| 2005/0099977 | A1 | 5/2005 | Williams et al. |
| 2005/0157661 | A1 | 7/2005 | Cho |
| 2005/0177639 | A1 | 8/2005 | Reunamaki et al. |
| 2005/0181872 | A1 | 8/2005 | Acharya et al. |
| 2005/0197189 | A1 | 9/2005 | Schultz |
| 2005/0250487 | A1 | 11/2005 | Miwa et al. |
| 2005/0250497 | A1* | 11/2005 | Ghosh et al. ................ 455/436 |
| 2005/0268003 | A1 | 12/2005 | Wang et al. |
| 2005/0286456 | A1 | 12/2005 | McNew et al. |
| 2006/0041750 | A1 | 2/2006 | Carter et al. |
| 2006/0045138 | A1 | 3/2006 | Black et al. |
| 2006/0135262 | A1 | 6/2006 | Kennedy et al. |
| 2006/0205409 | A1 | 9/2006 | Chiou et al. |
| 2006/0268711 | A1* | 11/2006 | Doradla et al. .............. 370/235 |
| 2007/0047547 | A1 | 3/2007 | Conner et al. |
| 2007/0060355 | A1 | 3/2007 | Amaitis et al. |
| 2007/0060358 | A1 | 3/2007 | Amaitis et al. |
| 2007/0076683 | A1 | 4/2007 | Chung |
| 2007/0086394 | A1 | 4/2007 | Yamada et al. |
| 2007/0099703 | A1 | 5/2007 | Terebilo |
| 2007/0202910 | A1* | 8/2007 | Brewer et al. ............... 455/521 |
| 2008/0039015 | A1* | 2/2008 | Nakata et al. ................. 455/39 |
| 2008/0069105 | A1 | 3/2008 | Costa et al. |
| 2008/0095112 | A1* | 4/2008 | Wiemann et al. ........... 370/331 |
| 2009/0191878 | A1* | 7/2009 | Hedqvist et al. ............ 455/441 |

OTHER PUBLICATIONS

"Universal Mobile Access: UMA Expands Beyond Dual-Mode Handsets"; The UMA Company; Jan. 2007; 8 pages.

IEEE Standards Board. "Part 11: Wireless LAN Medium Access Control (MAC) and Physical Layer (PHY) Specifications." IEEE Std. 802.11, 1999 (R2003); 47 pages.

Newton, Harry. Newton's Telecom Dictionary: the Official Dictionary of Telecommunications & the Internet. 15th ed. New York: Miller-Freeman, 1999. 762+. Print.

* cited by examiner

SEAMLESS SWITCHING OF MEDIA STREAMS BETWEEN DIFFERENT NETWORKS

This application claims benefit and priority of Provisional Application Ser. No. 60/860,627 filed Nov. 20, 2006.

FIELD OF THE INVENTION

The present invention relates to packet communication networks in transmission of media or real time streams of data.

BACKGROUND OF THE INVENTION

Mobile wireless telephones and the wireless communication systems that support their communications have dramatically expanded their role from simple node to node voice communications between two persons. Currently, mobile wireless communication devices and systems supporting their communications have the ability to transmit and receive data with many other devices. One of the most popular data streams which is desired by a user are media transmissions from a media source including audio and/or video for real time play through a user's mobile device. A popular source of media transmissions are by way of Internet access to a media server. Media servers include programs which establish media files and provide access control, typically requiring some form of payment prior to media transmission of desirable content such as musical performance or movies. Alternately, a more limited computer network may provide a critical portion of a communication link between a user's device and a media server. A limited but growing application of data transfer from a telephone enabled mobile device are VoIP phones are can transform voice into packets transmittable by Internet Protocol, i.e., VoIP. It is well known that portions of a communications session between a VoIP phone and a recipient device may include transmission of data signals through cellular, PSTN and/or other communications networks as links in the overall communications path.

Current mobile devices capable of telephone communications with other device have also increased the number of communications networks to which they can establish communication sessions by addition of communications modules linked to a microprocessor that operates a control program for the mobile device. Mobile cellular telephones enabled for communication by a cellular network (with various protocols such as GSM, CDMA, or W-CDMA) providing antennas for reception in a cellular territory may also have the ability to establish communications with a Wi-Fi network whose broadcast range has been detected by the cellular telephone. Wi-Fi networks are well known to operate under the IEEE 802.11 protocols for initiation, establishing and controlling communications between a base station and wireless access points. A base station typically provides access to communications by way Internet and/or local computer networks.

Some cellular mobile devices are enabled to communicate by way of DECT (Digital Enhanced Cordless Telecommunications) radio established for cordless telephones with a limited broadcast range. These radio devices typically communicate wirelessly with a broadcasting base station which is connected by wired connection with the PSTN system. DECT radio base stations have very limited broadcast ranges as compared with cellular networks, typically in range of 100 yards maximum. Data transfer to and from a mobile device by way of a DECT radio connection is somewhat more difficult than by way of a cellular or Wi-Fi network but can be accomplished by providing the base station with a modem which is enabled for connection with the Internet (and through an ISP).

Another communications network available to many mobile devices is a peer to peer network, which is wirelessly established ad hoc between two or more peer wireless communications devices. Establishing a wireless peer to peer network and exchanges of data which are allowed are performed under well known peer to peer architecture. Peer to peer networks can be structured or unstructured. It is well known that such peer to peer wireless networks are effective for transfer of media data such as audio and/or video files.

The above communications networks each have highly variable latency, bandwidth and packet loss characteristics relating to transmission of media data to a mobile device and each also is, at a specific period of time, is significantly different as between such networks. This variability is affected by inevitable swings in packet traffic, connection hand-offs or losses among broadcast ranges of nearby antennas, inherent limits on data transfers, and many other factors. In the end, a user of a mobile device is not concerned about the communications path actually traversed by a packetized media data stream as long as it plays well through the playout means of the mobile device. Such playout means may include a liquid crystal display screen for viewing video content and a speaker for playing audio content.

There is a need for a system which improves real time delivery of packetized media data streams from a media source to a mobile user.

SUMMARY OF THE INVENTION

The present invention is a system of reception or transmission of media data, such as for audio or video streams, so that data communications alternate transmission or reception routes between available communications networks, choosing among parallel or single communications paths a most efficient and/or fastest path for transmission of media packets.

A parallel form of the invention requires simultaneous transmission of a media data stream over two or more different communications networks. For instance, a cellular phone enabled with Wi-Fi network connection ability will transmit a data stream simultaneously and continuously to the cellular network and through the Wi-Fi network, where both networks have communications links with the same computer network providing packet transmission directly or indirectly to a recipient device. A microprocessor or the recipient device receives and saves a first arriving of two identical packets, reserving a decision to delete a second arriving packet based upon requirement for immediate playout and/or damage or loss detected in the second arriving packet.

In a parallel to single channel form of the invention, a mobile device transmits a media stream to two or more communications networks simultaneously and continuously at a first phase. A recipient device (or intermediate server in the computer network) receives duplicate packets and compares timestamps contained in each of two (or more) identical packets. No switching to a single channel (single communication network) occurs until the recipient device determines that duplicate, arrived data packets have identical timestamps. One benefit of this comparison prior to channel shutdown to a single channel is for source assurance. The recipient device also compares transmission times and viability of arrived data packets to arrive at a determination of a most reliable and/or fastest communications path for the stream of data packets from the user's device. The data required for the determination of best or fastest communication path or the final determination are transmitted to the user's device. The user's device will compare the received data and/or determination of best or fastest path and determine whether one or more or the communications sessions with the communications networks should be terminated. Consideration by the user's mobile device will include relative signal strengths of the wireless communications links with those networks, giving more weight to maintaining communications via a network with a better signal strength or better inherent data transfer rate.

Alternately, the user's mobile device can select a primary transmission to a communications network, preferably one with the highest inherent data transfer rate, and transmit a continuous stream of media data via that network to a recipient device. Concurrently, test transmissions are sent via other communications networks for the purpose of determining whether the alternate networks represent the best or fastest communication path to the recipient device.

In a preferred form, switching from transmission of a media data stream to a recipient device from one communication network to another will only take place when compression and framing of packets are matched and data rates are determined to be the same or better for the hand-off network.

DETAILED DESCRIPTION OF THE INVENTION

The invention is now discussed with reference to the figures.

Figure 1:
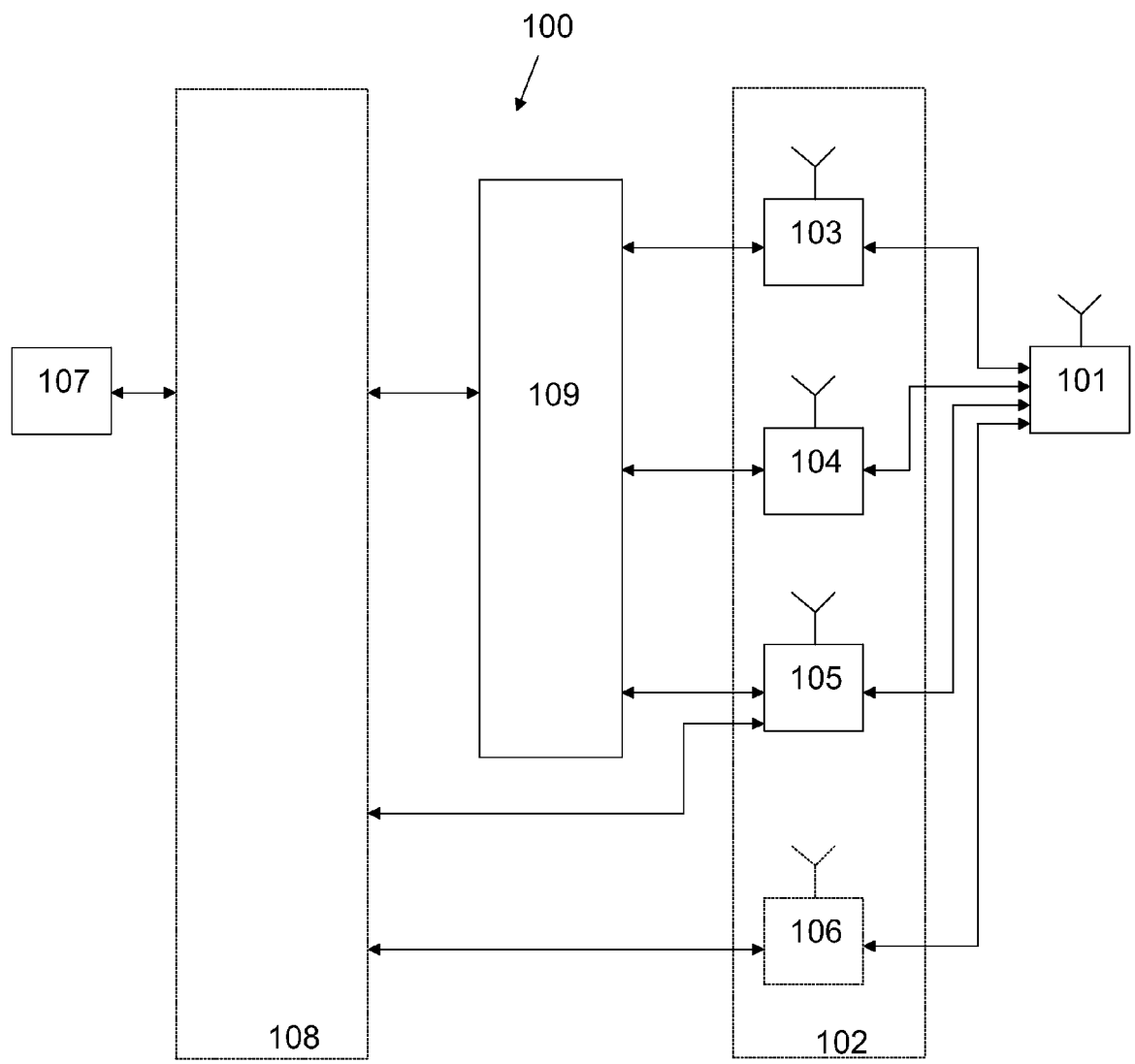
FIG. 1 is a block diagram of the invention system for improving media data transmission from a mobile device to a recipient device.

FIG. 1 is a block diagram of the invention system 100 for improving media data transmission from a mobile device 101 to a recipient device 107. It is intended that two or more communications networks in wireless communications interface 102 will establish communications sessions with mobile device 101 for the purpose of forming, at least initially, parallel, continuous and simultaneous data packet streams that are transmitted to recipient device 107. Mobile device 101 is a wireless communication device capable of establishing and maintaining the parallel transmission paths just described and is also capable of establishing wireless telephone communications with recipient device 107.

Communication network 103 comprises a cellular communication system including its antenna communications devices and its extensive system of communication connection assurance. Communication network 105 comprises a Wi-Fi network comprising a base station and wireless access points establishing a local broadcasting range. Communication network 104 comprises a DECT radio system equipped with means for establishing data communications with recipient device 107. Peer to peer network 106 (shown in broken lines) comprises a direct wireless data packet communication session between mobile device 101 and recipient device 107.

Networks 103, 104 and 105 are adapted to connect to a packet computer network 109 (such as an Internet Protocol network) whereby the packetized media data stream formed at mobile device 101 is transmitted to a recipient interface 108, which may or may not include intervening communications networks such as those found in interface 102. Wi-Fi network 105 may bypass network 109 by using a local protocol for transmitting packetized data between local users of a Wi-Fi network similar to such transmissions in peer to peer network 106.

Figure 2:
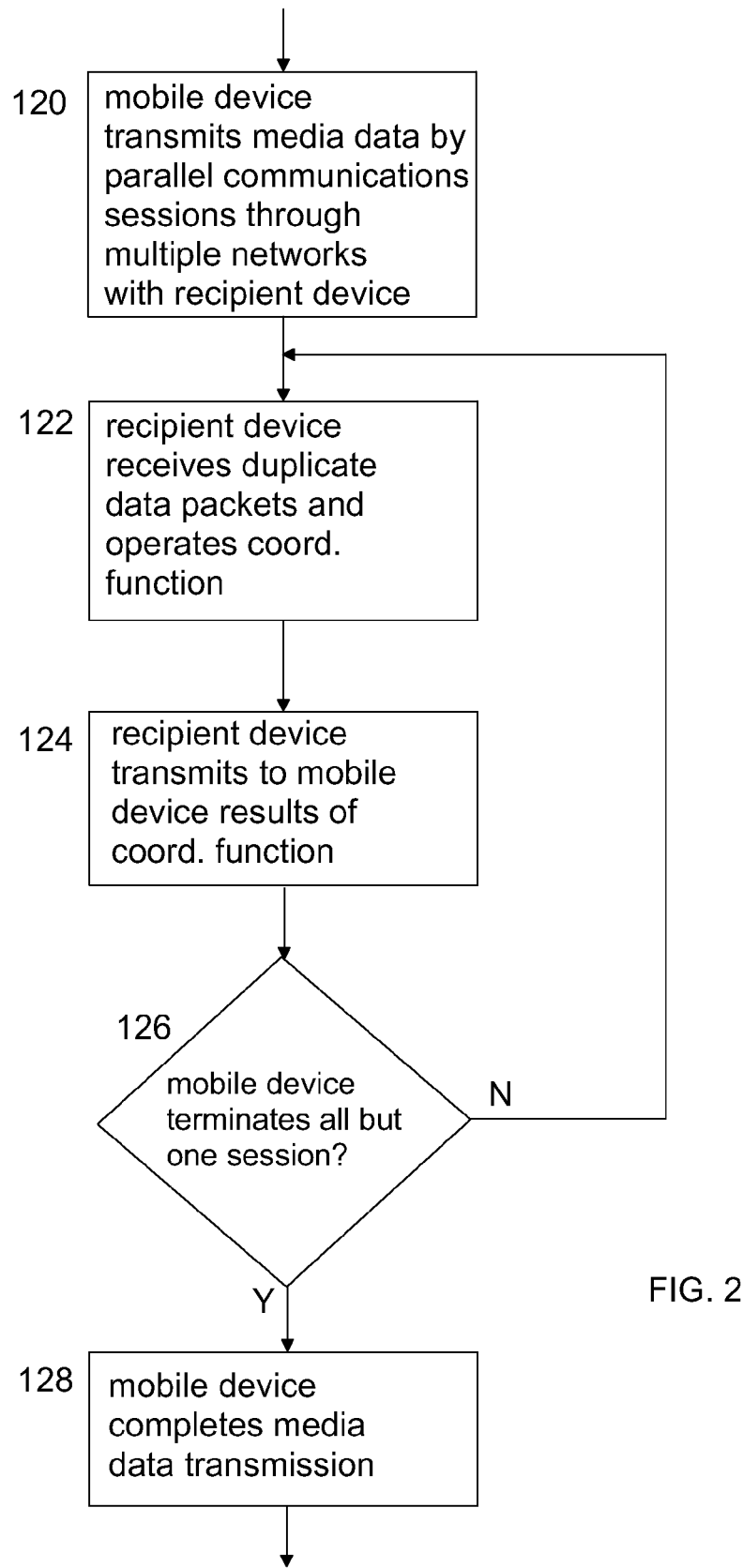
FIG. 2 is a high level flow diagram of the invention system.

FIG. 2 is a high level flow diagram of the invention system. Step 120 causes a mobile device as described above to establish parallel and simultaneous communications sessions with one or more of the wireless communications networks described above and to transmit a packetized media data stream to a recipient device, duplicating the transmitted packets along parallel communication paths.

Step 122 causes a recipient device, comprising a microprocessor and control program, to execute a coordination function to evaluate arrived packets. The coordination function in one form compares timestamps of duplicate packets to assure that such packets are in fact duplicates. The coordination function further compares transmission times from sampled sets of duplicate arrived packets and determines by averaging which of the communications networks has transmitted the media data stream at the fastest overall rate and which of the communications networks has transmitted data at the slowest overall rate. The recipient device in step 124 transmits to the mobile device either or both of said transmission times and the determination of the fastest and/or slowest communications network.

In step 126, the mobile device acts to terminate communication sessions with a slowest rate communication network and determines if sessions with all but one of the communications networks have been terminated. If all but one have not been terminated, step 126 returns the system to step 122. If all but one communications sessions have been terminated, the mobile device completes transmission of the media data stream to the recipient device in step 128.

In a preferred embodiment of the invention, a determination is made by the invention system that transmission of data packets in a first communications network are more reliable than transmission of data packets by way of other communications networks, all of which a plurality of communications networks current maintain communications sessions with the mobile device described above. In making that determination, the mobile device stores reliability information received from the recipient device concerning previously transmitted data packets. In a first specific example, the recipient device determines packet loss for a predetermined number of packets as indicated by expected packet sequence numbers for each data packet stream received from each communications networks from and with which the mobile device has established communications and which communication networks the recipient device has also established communications. The recipient device operates to determine which communications network's transmission of data packets has resulted in the lowest number of lost data packets and this result is transmitted to the mobile device, whereupon the mobile device identifies said lowest loss communication network as the most reliable media data stream and acts to terminate communications with other communications networks.

In a second specific example, the recipient device determines the strongest signal strength of wireless communications links between the recipient device and each of said communications networks for a predetermined time or over the course of receiving a predetermined number of data packets from the mobile device in parallel over multiple communications networks. Said determination of a strongest signal for a communication network is transmitted to the mobile device, whereupon the mobile device identifies said strongest signal strength for a communication network connected with the recipient device as the most reliable media data stream and acts to terminate communications with other communications networks.

In a third specific example, the mobile device determines the strongest signal strength of wireless communications links between the mobile device and each of said communications networks for a predetermined time or over the course of transmitting a predetermined number of data packets to the recipient device in parallel over multiple communications networks. Said determination of a strongest signal for a communication network is acted upon by the mobile device, whereby the mobile device identifies said strongest signal strength for a communication network connected with the mobile device as the most reliable media data stream and acts to terminate communications with other communications networks.

In a fourth specific example, the mobile device obtains the recipient device determination of strongest signal communication network as in the second specific example and also determines the strongest signal strength of wireless communications links between the mobile device as in the third specific example. If the recipient device has determined that a first communications network is the strongest signal network and the mobile device has determined that a second communications network is the strongest signal network for the mobile device, the mobile device identifies said strongest signal strength for a communication network connected with the mobile device as the most reliable media data stream and acts to terminate communications with other communications networks. Alternately, the mobile device identifies said strongest signal strength for a communication network connected with the reliable device as the most reliable media data stream and acts to terminate communications with other communications networks. The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:

1. A system of parallel wireless communication sessions transmitting a packetized stream of media data having an audio component or a video component, the system comprising:
    a mobile device comprising
        a first microprocessor having means for establishing and maintaining
            communication sessions with two or more wireless networks at the same time, and
            communications with a recipient device,
        multiple wireless communications modules connected to the first microprocessor, wherein each wireless communications module is adapted to wirelessly communicate with a different communication network, and
        means for packetizing a stream of media data stored in a memory of the first microprocessor;
    the recipient device comprising
        a second microprocessor having means for establishing and maintaining
            a communication session with the mobile device, and
            a telephone call to the mobile device,
        means for performing a coordination function, wherein duplicate packets, transmitted by the mobile device in a parallel communication to more than one communication network at the same time, arrive at the recipient device at different times, and
            a determination is made as to
                which communication network has transmitted a most reliable media data stream, and
                which communication network has a slowest transmission rater, and
        means for transmitting to the mobile device results of operation of the coordination function; and
    wherein the mobile device further comprises means for receiving the results of operation of the coordination function, and
        (i) terminating the communication session with the communication network with the slowest transmission rate, or
        (ii) terminating all communication sessions with communication networks except with the communications network having the most reliable transmission.

2. The system of claim 1, wherein the means for performing the coordination function include
    means for comparing timestamps on duplicate packets, and
    means for transmitting a message to the mobile device to maintain all communications sessions if the timestamps do not match.

3. The system of claim 1, wherein the means for performing the coordination function include means for matching methods of compression and degrees of compression of packets between communication paths.

4. The system of claim 1, wherein the means for performing the coordination function include means for matching framing of packets between communication paths.

5. The system of claim 1, wherein the means for performing the coordination function include means for matching data rates between communication paths.

6. The system of claim 1, wherein the means for performing the coordination function include means for determining the most reliable communication path.

7. The system of claim 6, wherein the means for performing the coordination function include means for determining a most reliable communication path, and wherein determining the most reliable communication path includes measurement of packet loss.

8. The system of claim 6, wherein the means for performing the coordination function include means for determining a most reliable communication path, and wherein determining the most reliable communication path includes measurement of signal strength.

9. A system comprising:
    a recipient device configured to
        receive duplicate packets via a plurality of networks, wherein each of the duplicate packets has a corresponding timestamp,
        compare timestamps of the duplicate packets, and
        determine when the timestamps associated with the duplicate packets match; and
    a mobile device configured to
        transmit the duplicate packets to the recipient device via the plurality of networks, and
        in response to the mobile device having received indication from the recipient device that the timestamps of the duplicate packets match,
            (i) transmit remaining packets to the recipient device via one of the plurality of networks selected by the recipient device, and
            (ii) terminate transmission of the duplicate packets to the recipient device.

10. The system of claim 9, wherein the recipient device is configured to select the one of the plurality of networks in response to the timestamps of the duplicate packets matching.

11. The system of claim 9, wherein the recipient device is configured to inform the mobile device that the mobile device is to transmit the remaining packets to the recipient device via the one of the plurality of networks in response to the timestamps of the duplicate packet matching.

12. The system of claim 10, wherein the recipient device is configured to select one of the plurality of networks based on at least one of the following criteria associated with the plurality of networks:
   method of compression,
   data rate,
   packet loss, and
   signal strength.

13. The system of claim 9, wherein the plurality of networks include a cellular network and a WiFi network.

14. A method comprising:
   transmitting duplicate packets from a mobile device to a recipient device via a plurality of networks, wherein each of the duplicate packets has a corresponding timestamp;
   receiving the duplicate packets at the recipient device;
   comparing timestamps of the duplicate packets received at the recipient device; and
   determining when the timestamps of the duplicate packets match;
   selecting one of the plurality of networks to receive remaining packets from the mobile device in response to the timestamps of the duplicate packets matching; and
   informing the mobile device that the mobile device is to transmit the remaining packets to the recipient device via the one of the plurality of networks when the timestamps match.

15. The method of claim 14, further comprising: in response to having received indication from the recipient device that the timestamps of the duplicate packets match
   (i) transmitting the remaining packets from mobile device to the recipient device via the one of the plurality of networks, and
   (ii) terminating transmission of the duplicate packets from mobile device to the recipient device.

16. The method of claim 14, further comprising selecting the one of the plurality of networks based on at least one of the following criteria associated with the plurality of networks:
   type of compression, data rate, packet loss, and signal strength.

* * * * *